United States Patent [19]

Zimmermann

[11] Patent Number: 4,476,417
[45] Date of Patent: Oct. 9, 1984

[54] CONTROL ARRANGEMENT FOR A STATIC CONVERTER

[75] Inventor: Horst Zimmermann, Erlangen, Fed. Rep. of Germany

[73] Assignee: Siemens Aktiengesellschaft, Munich, Fed. Rep. of Germany

[21] Appl. No.: 515,181

[22] Filed: Jul. 19, 1983

[30] Foreign Application Priority Data

Aug. 13, 1982 [DE] Fed. Rep. of Germany ....... 3230206

[51] Int. Cl.³ .............................................. G05B 5/00
[52] U.S. Cl. .................................... 318/329; 318/311; 318/317; 318/326
[58] Field of Search ............... 318/311, 317, 326, 327, 318/345 C, 345 G, 461, 463, 464, 616, 618, 629

[56] References Cited

U.S. PATENT DOCUMENTS 3,508,132 4/1970 Peterson ........................ 318/327 X
3,950,683 4/1976 Lamson .............................. 318/327
4,119,897 10/1978 Skoog ............................. 318/317 X
4,286,199 8/1981 Nagakubo et al. .................. 318/327

FOREIGN PATENT DOCUMENTS 3020139 12/1981 Fed. Rep. of Germany .

OTHER PUBLICATIONS

W. L. McDougal et al., Direct Current Motors and Generators, 1947, American Technical Society, Chicago, pp. 255–262.

Primary Examiner—Ulysses Weldon
Attorney, Agent, or Firm—Kenyon & Kenyon

[57] ABSTRACT

A control arrangement for a static converter of the type which supplies a DC machine. A pilot signal is produced, the pilot signal being responsive to the actual speed value and the desired current value of the DC machine. The pilot signal is then combined with a control signal of the converter so as to improve the dynamic characteristic of the control arrangement.

3 Claims, 1 Drawing Figure

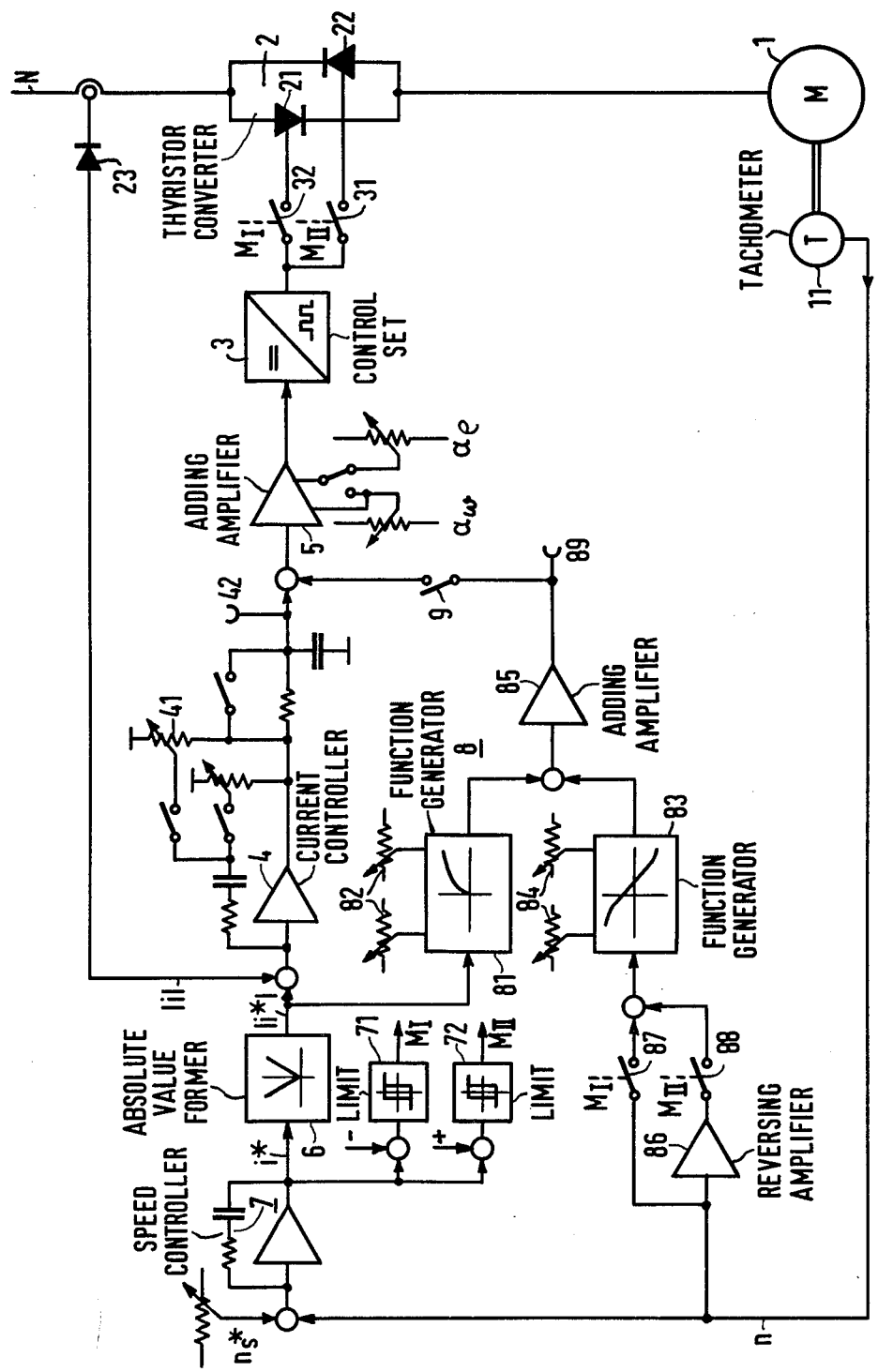

CONTROL ARRANGEMENT FOR A STATIC CONVERTER

BACKGROUND OF THE INVENTION

This invention relates generally to arrangements for controlling machines with a static converter, and more particularly, to an arrangement for controlling a static converter with at least one valve group controlled by a control set for supplying a DC machine, and with a current controller which is responsive to a speed controller which produces a control signal for controlling the valve group connected to the armature circuit of the DC machine.

Known circuits of the general type under consideration herein are illustratively provided with antiparallel-connected groups of thyristor valves with a control set for each valve group, or a control set common to both valve groups. The control pulses of the control set are fed via a pulse switch to the valve group which is to conduct current at that moment. A DC motor is controlled by supplying an actual feed value and a desired feed value together to a speed controller which produces an output signal which serves as the control input for a current controller which receives the actual current from the AC side of the converter. The output signal of the current controller then controls the common control set. A required change in the direction of the armature current is determined by a command stage which issues the appropriate control commands. Known circuits of the type discussed herein are described, for example, "Siemens-Zeitschrift", 1965, pages 251 and 1081, German Pat. No. 15 88 783; and German Offenlegungsschrift No. 30 20 139.

It is, therefore, an object of this invention to improve the dynamic behavior of a control arrangement of the type discussed hereinabove.

SUMMARY OF THE INVENTION

The foregoing and other objects are achieved by this invention which provides a control arrangement for a static converter having a thyristor valve group controlled by a control set for supplying a DC machine and further having a current controller which is responsive to a speed controller. The current controller delivers a control signal to the control set of the valve connected to the armature circuit of the DC machine. The control set further receives a pilot signal which corresponds to the actual speed value, and the control input of the armature current controller. In this manner, the current controller is required to contribute only a small correction value, i.e., the control itself needs to correct only a relatively small part of the control deviation, because the preliminary signal already corresponds substantially to the required signal. By this arrangement, the control dynamics of the converter are increased substantially.

The foregoing control arrangement is well suited for implementation with a microprocessor because the pilot control signals can be calculated relatively simply from the actual speed value and the current control input, or can be taken from appropriate tables.

BRIEF DESCRIPTION OF THE DRAWING

Comprehension of the invention is facilitated by reading the following detailed description in conjunction with the annexed drawing which is a partially schematic and partially function block representation of a circuit arrangement constructed in accordance with the principles of the invention.

DETAILED DESCRIPTION

The FIGURE illustrates a schematic and function block representation of an embodiment of the invention showing an armature winding of a DC machine 1 which is supplied from an AC network N via a reversing thyristor converter 2, free of circulating currents, with two antiparallel-connected valve groups 21 and 22. The addressing commands for valve groups 21 and 22 are furnished by a control set 3, depending upon a direction of the armature current, via a separating switch 31 or 32 controlled by a respective one of command stages 71 and 72, by commands $M_i$ and $M_{ii}$, respectively. The control voltage for control set 3 is furnished by a current controller 4 via an adding amplifier 5 at which can be set the inverter tripping limit $\alpha_\omega$ and the rectifier limit $\alpha_\rho$.

A speed controller 7 of machine 1 receives input values which are proportional to the desired speed $n_s$ and, from a tachometer machine 11, a signal corresponding to the actual speed n. Speed controller 7 supplies at its output a quantity proportional to the desired current value i*. In an absolute value former 6, the absolute value $|i^*|$ is formed from the value i* and conducted to a current controller 4 as a control input. Moreover, a value proportional to the absolute value of the actual current value is conducted to the current controller as the actual value. The actual current value i is measured on the AC side and converted by means of a rectifier 23 into a corresponding absolute value $|i|$. From a comparison of the actual and desired current values at the input of current controller 4, the control unit for the control set 3 is formed in the current controller. Advantageously, the current controller 4 can be designed, as indicated by a feedback circuitry 41, as a so-called "adaptive controller." An adaptive controller is a controller which changes its control characteristic depending upon whether or not the arrangement operates in the current interval region. The choice of the proper feedback is assumed by the command stage in a manner which is not shown in detail.

Since only the absolute values of the current control input and the actual current value are compared with each other, a defined operating state of the reversing converter can be assigned to each polarity of the current control output signal. A positive polarity of the current control output voltage, for example, signifies an inverter command for control set 3, and a negative polarity signifies a command for rectifier operation. The one of valve groups 21 and 22 provided for the respectively required current direction (torque direction) is similarly selected by the command stage by means of suitable opening and closing of switches 31 or 32. The command stage determines the selection command from the polarity of the output signal of speed controller 7. For sake of simplicity, only two limit indicators 71 and 72 are shown for the command stage. The two limit indicators are connected to the output of speed controller 7 and, by comparison with fixed voltages, the limit indicators determines which armature current direction is required. The armature current directions (torque directions) are designated $M_i$ and $M_{ii}$, respectively. These current directions are conducted as corresponding control commands to switches 31 and 32. Circuitry of this type is known from DE-OS No. 30 20 139.

In addition to the above-described known circuitry, a dynamic supplement or pilot generator 8 is provided by which the dynamic properties of the arrangement can be improved. Dynamic supplement 8 consists of function generator 81 which is connected to the output of absolute value former 6 and therefore receives a value proportional to the current control input i*. A speed function generator 83 receives a signal proportional to the actual speed value n either via a switch 87 or via a reversing amplifier 86 and switch 88. The function waveforms and the null point of the functions in function generators 81 and 83 can be set by potentiometers 82 and 84. The output signals of function generators 81 and 83, are combined in an adding amplifier 85, are conducted as a pilot signal via a switch 9 to the output signal of current controller 4, the input of adding amplifier 5, and thereby to control set 3.

Function generators 81 and 83 are set in such a manner that they form, from the current control input and the actual speed value, a signal which corresponds approximately to the signal which controller 4 would furnish under the same conditions if it were in full engagement. Such a setting can be accomplished when starting up in a relatively simple manner, as follows:

With switch 9 open, the voltage at measuring jack 89 is adjusted, illustratively at standstill and with the current at zero, by changing potentiometers 82. The voltage at measuring jack 42 at the output of current controller 4 is adjusted to the same voltage value. Subsequently, the voltage measurement is repeated for maximum speed without load. With such an adjustment, one obtains a null point and a slope of the characteristic which represents the required shape between current control input i* and speed n without load.

Subsequently, the same cycle is repeated at current function generator 83. More specifically, the same voltage is adjusted at measuring jack 42 and measuring jack 89 for maximum current. When the two function generators are set, switch 9 is closed. Thus, an approximate value is available at the input of adding amplifier 5 which is necessary for operating control set 3 with the desired current value and the present actual value. As a consequence, during operation, the desired action on the converter is performed immediately by the pilot control such that only a relatively small part of the total control needs to be supplied by current controller 4 for exact matching. In this manner, the control dynamics characteristic of the current controller is rendered to be essentially unimportant, and only its accuracy remains important. Such accuracy, as noted hereinbefore, can be achieved with the use of a microprocessor, as well as with the generation of the pilot signal.

Although the invention has been described in terms of specific embodiments and applications, persons skilled in the art, in light of this teaching, can generate additional embodiments without departing from the spirit or exceeding the scope of the claimed invention. Accordingly, the drawing and description in this disclosure are proffered to facilitate comprehension of the invention and should not be construed to limit the scope thereof.

What is claimed is:

1. In a static converter for controlling a DC motor including at least one thyristor valve group coupled to the motor, a control set coupled to the thyristor valve group for controlling the thyristor valve group, a current controller coupled to the control set for generating a first signal, said first signal being supplied to said control set, and a speed controller adapted to receive a signal representative of the speed of the motor for generating a second signal, said second signal being supplied to the current controller, the improvement comprising pilot signal means adapted to receive a signal representative of the speed of the motor, the pilot signal means further being coupled to receive the second signal from the speed controller and being coupled to the control set to provide a pilot signal thereto responsive to the motor speed representative signal and the second signal from the speed controller, the control set controlling the thyristor valve group in response to said first signal from the current controller and said pilot signal.

2. The improvement recited in claim 1 wherein said pilot signal means comprises first and second function generator means, said first function generator means receiving said second signal and generating a first control value signal and said second function generator means receiving a signal representative of the speed of the motor and generating a second control value signal and summing means, said first and second control value signals being supplied to said summing means for producing said pilot signal, said summing means being responsive to the polarities of said first and second control value signals.

3. The improvement recited in claim 2, further comprising means for initially adjusting said first and second function generator means so as to produce a pilot signal which matches substantially said first signal.

* * * * *